US011809274B2

(12) United States Patent
Tal et al.

(10) Patent No.: US 11,809,274 B2
(45) Date of Patent: Nov. 7, 2023

(54) RECOVERY FROM PARTIAL DEVICE ERROR IN DATA STORAGE SYSTEM

(71) Applicant: EMC IP Holding Company LLC, Hopkinton, MA (US)

(72) Inventors: Doron Tal, Geva Carmel (IL); Yoav Peled, Tel Aviv (IL); Itay Keller, Tel Aviv (IL); Asaf Porath, Tel Aviv (IL); Neta Peleg, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 78 days.

(21) Appl. No.: 17/236,256

(22) Filed: Apr. 21, 2021

(65) Prior Publication Data

US 2022/0342758 A1 Oct. 27, 2022

(51) Int. Cl.
*G06F 11/00* (2006.01)
*G06F 11/10* (2006.01)
(Continued)

(52) U.S. Cl.
CPC .......... *G06F 11/1092* (2013.01); *G06F 3/067* (2013.01); *G06F 3/0619* (2013.01);
(Continued)

(58) Field of Classification Search
CPC ............. G06F 11/1092; G06F 11/0772; G06F 11/1435
See application file for complete search history.

(56) References Cited

U.S. PATENT DOCUMENTS 5,381,539 A 1/1995 Yanai et al.
5,488,701 A * 1/1996 Brady .................... G11C 29/74
714/6.24

(Continued)

FOREIGN PATENT DOCUMENTS

WO PCT/US2019/024885 1/2020
WO PCT/US2019/024900 1/2020
(Continued)

OTHER PUBLICATIONS

Dell EMC, "Dell EMC VxRack FLEX," Dell EMC Product Overview, 2018, 5 pages.
(Continued)

*Primary Examiner* — Philip Guyton
(74) *Attorney, Agent, or Firm* — Ryan, Mason & Lewis, LLP

(57) ABSTRACT

Techniques are provided to recover from partial device errors of storage devices in a data storage system. A storage control system manages a storage device which comprises storage capacity that is logically partitioned into segments of equal size. The storage control system groups at least some of the segments of the storage device into a segment group. Each segment of the segment group is configured to store one or more data items and associated metadata items. The storage control system generates a parity data segment based on the segments of the segment group, and persistently stores the parity data segment in association with the segment group. In response to detecting a storage device error associated with a corrupted segment of the segment group, the storage control system utilizes the parity data segment and non-corrupted segments of the segment group to recover at least one missing data item of the corrupted segment.

20 Claims, 7 Drawing Sheets

(51) Int. Cl.
*G06F 11/14* (2006.01)
*G06F 3/06* (2006.01)
*G06F 11/07* (2006.01)

(52) U.S. Cl.
CPC ........ *G06F 3/0644* (2013.01); *G06F 11/0772* (2013.01); *G06F 11/1435* (2013.01)

(56) References Cited

U.S. PATENT DOCUMENTS

| | | | |
|---|---|---|---|
| 5,551,003 | A | 8/1996 | Mattson et al. |
| 5,600,816 | A * | 2/1997 | Oldfield .............. G06F 11/1008 711/E12.019 |
| 5,764,880 | A | 6/1998 | Gerdt et al. |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0177857 | A1 * | 7/2009 | Butterworth ........ G06F 11/1453 711/E12.103 |
| 2009/0204761 | A1 | 8/2009 | Caprioli et al. |
| 2009/0276593 | A1 | 11/2009 | Jacobson et al. |
| 2013/0282953 | A1 * | 10/2013 | Orme ..................... H04L 12/66 711/102 |
| 2013/0305002 | A1 | 11/2013 | Hallak et al. |
| 2014/0244935 | A1 | 8/2014 | Ezra et al. |
| 2016/0103764 | A1 | 4/2016 | Banerjee et al. |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

FOREIGN PATENT DOCUMENTS

| | | | |
|---|---|---|---|
| WO | 2020204880 | A1 | 10/2020 |
| WO | 2020204882 | A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006. 1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
U.S. Appl. No. 16/807,709 filed in the name of Avi Puder et al. Mar. 3, 2020, and entitled "Management of Shared Resources in a Software-Defined Storage Environment."
U.S. Appl. No. 16/822,818 filed in the name of Itay Keller et al. Mar. 18, 2020, and entitled "Storage System Implementing Snapshot Longevity Ranking for Efficient Management of Snapshots."
U.S. Appl. No. 16/822,848 filed in the name of Itay Keller et al. Mar. 18, 2020, and entitled "Assignment of Longevity Ranking Values of Storage Volume Snapshots Based on Snapshot Policies."
U.S. Appl. No. 16/823,813 filed in the name of Itay Keller et al. Mar. 19, 2020, and entitled "Managing Incompressible Data in a Compression-Enabled Log-Structured Array Storage System."
U.S. Appl. No. 16/830,469 filed in the name of Roi Tagar et al. Mar. 26, 2020, and entitled "Storage Block Balancing Using vol. Part Migration."
U.S. Appl. No. 16/830,473 filed in the name of Yugal Peleg Lieblich et al. Mar. 26, 2020, and entitled "Replicated State Cluster with Standby Node State Assessment During Leadership Transition."
U.S. Appl. No. 16/830,946 filed in the name of Gil Ben Zeev et al. Mar. 26, 2020, and entitled "Storage Volume Migration Scheduling Based on Storage Volume Priorities and Specified Constraints."
U.S. Appl. No. 16/832,763 filed in the name of Michal Yarimi et al. Mar. 27, 2020, and entitled "Managing Storage Device Errors During Processing of Inflight Input/Output Requests."
U.S. Appl. No. 16/834,363 filed in the name of Itay Keller et al. Mar. 30, 2020, and entitled "Managing Least Recently Used Cache Using Reduced Memory Footprint Sequence Container."
U.S. Appl. No. 16/836,824 filed in the name of Itay Keller et al. Mar. 31, 2020, and entitled "Management of Volume Snapshots in a Data Storage System."
U.S. Appl. No. 16/888,742 filed in the name of Rivka Matosevich et al. May 31, 2020, and entitled "Balancing Resiliency and Performance by Selective Use of Degraded Writes and Spare Capacity in Storage Systems."
U.S. Appl. No. 16/918,654 filed in the name of Rivka Matosevich et al. Jul. 1, 2020, and entitled "Sharing Memory Resources Between Asynchronous Replication Workloads."
U.S. Appl. No. 16/983,423 filed in the name of Dan Aharoni et al. Aug. 3, 2020, and entitled "Deferred Reclamation of Invalidated Entries that are Associated with a Transaction Log in a Log-Structured Array."
U.S. Appl. No. 17/024,912 filed in the name of Anurag Sharma et al. Sep. 18, 2020, and entitled "Automatic Discovery and Configuration of Server Nodes."
U.S. Appl. No. 17/065,754 filed in the name of Dan Aharoni et al. Oct. 8, 2020, and entitled "Direct Response to IO Request in Storage System with Remote Replication."
U.S. Appl. No. 17/070,073 filed in the name of Dan Aharoni et al. Oct. 14, 2020, and entitled "Direct Response to IO Request in Storage System Having an Intermediary Target Apparatus."
U.S. Appl. No. 17/070,288 filed in the name of Anurag Sharma et al. Oct. 14, 2020, and entitled "Pipeline-Based System for Configuration Checking and Reporting Associated with an Information Processing System."
U.S. Appl. No. 17/071,407 filed in the name of John Moran et al. Oct. 15, 2020, and entitled "Dynamic Remediation Actions in Response to Configuration Checks in an Information Processing System."
U.S. Appl. No. 17/077,105 filed in the name of Yosef Shatsky et al. Oct. 22, 2020, and entitled "Volume Tiering in Storage Systems."
U.S. Appl. No. 17/106,988 filed in the name of Rivka Matosevich et al. Nov. 30, 2020, and entitled "Managing Host Connectivity to a Data Storage System."

(56) References Cited

OTHER PUBLICATIONS

U.S. Appl. No. 17/123,525 filed in the name of Itay Keller et al. Dec. 16, 2020, and entitled "Deferred Reclamation of Invalidated Entries Associated qith Replication in a Log-Structured Array."
U.S. Appl. No. 17/145,646 filed in the name of Yosef Shatsky et al. Jan. 11, 2021, and entitled "Redistribution of Processing Groups between Server Nodes Based on Hardware Resource Utilization."
U.S. Appl. No. 17/232,203 filed in the name of Roman Spiegelman Apr. 16, 2021, and entitled "Object synchronization of Server Nodes in a Network Computing Environment."

* cited by examiner

RECOVERY FROM PARTIAL DEVICE ERROR IN DATA STORAGE SYSTEM

TECHNICAL FIELD

This disclosure relates generally to data storage management techniques and, more specifically, to data protection and recovery techniques in a data storage system.

BACKGROUND

Distributed storage systems are implemented using a plurality of storage devices (e.g., storage arrays). The storage devices can reside locally in a given storage node, or the storage devices can reside on multiple storage nodes that are network connected using, e.g., a local area network or a storage fabric. Distributed storage systems typically implement data protection and data recovery techniques to protect against loss of critical system and application data. For example, data replication is one type of data protection technique that can be utilized to support data recovery. In general, data replication involves storing primary data (e.g., production data) at a primary site and storing a copy of the primary data at one or more remote sites to maintain one or more replicas of the primary data. When a given storage node at the primary site fails, or if a given storage device of the given storage node encounters a device error, the primary data of the failed storage node or the failed storage device can be rebuilt using a replica copy of the primary data.

Depending on the type of replication topology (e.g., full mesh replication topology) and/or the type of storage architecture (e.g., log-structured array (LSA) architecture) that is utilized to store data, data recovery and rebuild operations can be inefficient when attempting to recover from partial devices errors of a data storage device. In such instances, when there is an identified corrupted region on a data storage device, a storage control system cannot efficiently identify what logical addresses were lost without, e.g., scanning an entirety of the metadata items associated with the data items stored on the data storage device. More specifically, the storage control system can identify lost data items by scanning the entire metadata to find pointers to data items that reside in a corrupted region of the data storage device. However, such a process will be prohibitively slow, expansive, and resource intensive for most cases. In this regard, conventional schemes typically resort to a full device rebuild of the data storage device to fix local partial errors that that are encountered on the data storage device.

SUMMARY

Exemplary embodiments of the disclosure include methods to enable recovery from partial device errors in a data storage system. For example, in an exemplary embodiment, a storage control system manages a storage device which comprises storage capacity, wherein at least a portion of the storage capacity is logically partitioned into segments of equal size. The storage control system groups at least some of the segments of the storage device into a segment group, wherein each segment of the segment group is configured to store one or more data items and associated metadata items. The storage control system generates a parity data segment based on the segments of the segment group, and persistently stores the parity data segment in association with the segment group. In response to the storage control system detecting a storage device error associated with a corrupted segment of the segment group, the storage control system utilizes the parity data segment and non-corrupted segments of the segment group to recover at least one missing data item of the corrupted segment.

Other embodiments of the disclosure include, without limitation, systems and articles of manufacture comprising processor-readable storage media, which are configured to enable recovery from partial device errors in a data storage system

DETAILED DESCRIPTION

Exemplary embodiments of the disclosure will now be discussed in further detail with regard to systems and methods to enable recovery from partial device errors of storage devices in a data storage system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1:
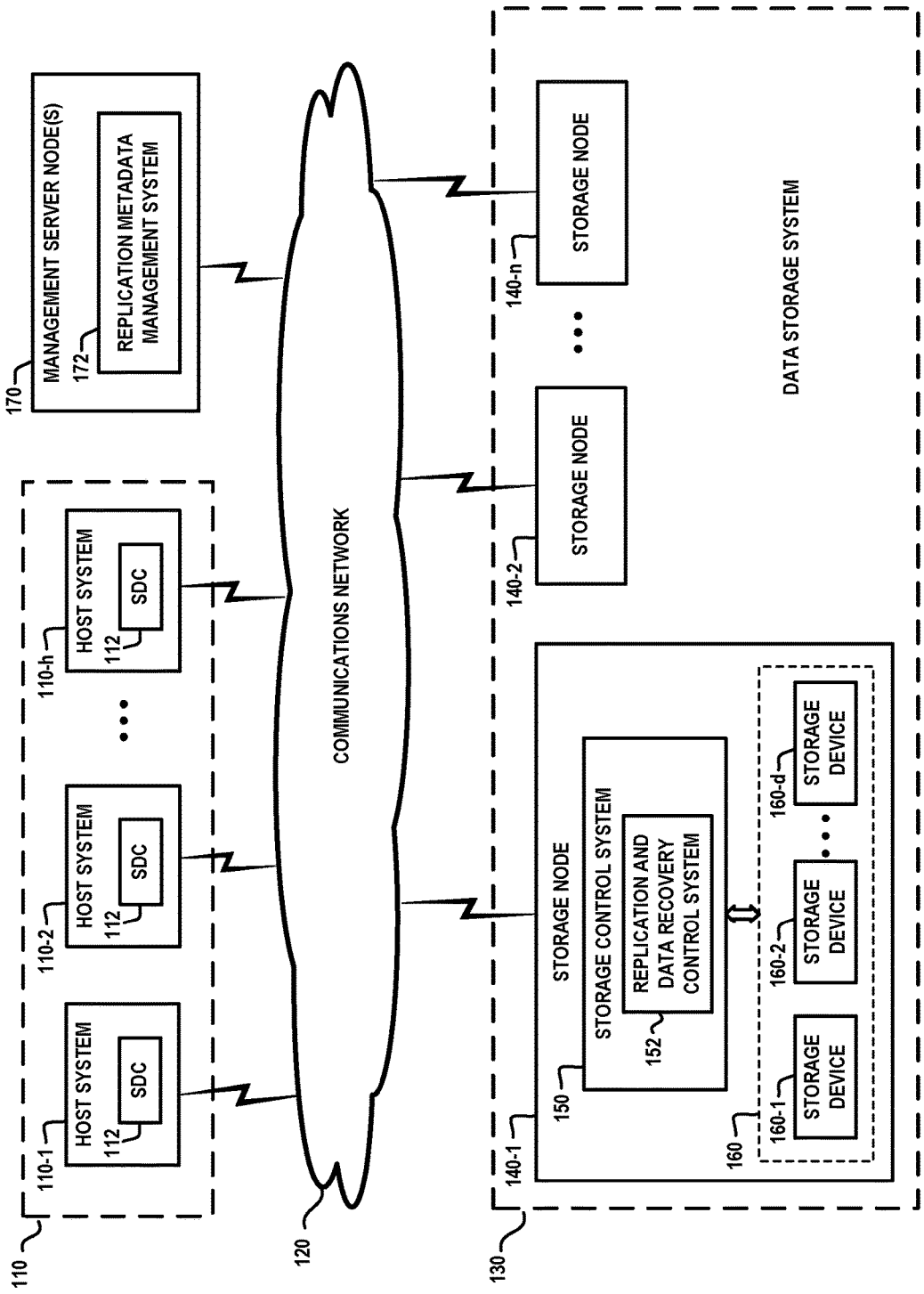
FIG. 1 schematically illustrates a network computing environment which comprises a data storage system that is configured to enable recovery from partial device errors, according to an exemplary embodiment of the disclosure.

FIG. 1 schematically illustrates a network computing environment which comprises a data storage system that is configured to enable recovery from partial device errors, according to an exemplary embodiment of the disclosure. In particular, FIG. 1 schematically illustrates a network computing system 100 which comprises one or more host systems 110-1, 110-2, ... 110-$h$ (collectively, host systems 110), a communications network 120, and a data storage system 130. In some embodiments, each host system 110-1, 110-2, ... 110-$h$ comprises a storage data client (SDC) 112, the function of which will be explained in further detail below. The data storage system 130 comprises one or more storage nodes 140-1, 140-2, ..., 140-$n$ (collectively, storage nodes 140). As shown in FIG. 1, the storage node 140-1 comprises a storage control system 150, and an array of storage devices 160-1, 160-2, ..., 160-$d$ (collectively, storage devices 160). In some embodiments, the other storage nodes 140-2 ... 140-$n$ have the same or similar configuration as the storage node 140-1 shown in FIG. 1.

The storage control system 150 comprises a replication and data recovery control system 152 to provide data protection services. In some embodiments, the replication and data recovery control system 152 comprises a mesh replication control system that is configured replicate and manage data in a full mesh replication topology that is implemented across groups of storage devices of the storage nodes 140 in the data storage system 130. Furthermore, in some embodiments, the replication and data recovery control system 152 comprises a data recovery control system which is configured to recover from partial device errors that are encountered on the local storage devices 160 without having to perform a full device rebuild. In some embodiments, the data protection and recovery techniques as disclosed herein are implemented in conjunction with a log structured array (LSA) control system in which data is organized and stored in the storage devices 160 in a log structured array.

Unlike standard data replication approaches which implement basic mirroring for data protection, mesh replication protection schemes provide for rebuild rates that are linearly proportional to the system size. In mesh replication systems, the data protection for every storage device is distributed across a given group (e.g., replication group) of eligible storage devices which reside on different storage nodes 140 in the data storage system 130, wherein upon failure of a given storage device, all storage devices in the replication group will participate in the rebuild process. This property allows the rebuild rate to increase linearly as the system grows. On the other hand, the mesh replication approach poses a challenge for the rebuild process since the rebuild becomes more complicated than a low-level copy of the surviving copy from a single replica node. Instead, the rebuild process works very much like a combination of reading data from various storage devices which have replica copies of the missing data, and writing the data to another storage device to regain resiliency.

The complexity of data recovery and device rebuild operations in a mesh replication system is further exacerbated when dealing with LSA systems. When LSA is combined with mesh replication, each storage device will hold a completely different placing of the other replicated blocks. A challenge arises when there is an identified corrupted region on a given storage device as replica copies of the missing data items within the corrupted region are located in many other storage devices. As explained in further detail below, the replication and data recovery control system 152 implements methods to enable partial device recovery in the context of a mesh replication topology and LSA storage architecture, without having to perform a full device rebuild when local errors (e.g., one or more data items in a given log segment) on a given storage device are encountered. By being able to recover from local device errors without resorting to full device rebuilds, the system can recover much quicker, thus significantly improving its resiliency and mean time between failures (MTBF). In addition, it allows the system to overcome multiple concurrent corruptions (or read errors) across different storage devices.

The network computing system 100 further comprises one or more management server nodes 170. The management server nodes 170 implement application programming interfaces (APIs) to enable manual, automated, and/or semi-automated configuration, management, provisioning, and monitoring of the data storage system 130 and associated storage nodes 140. In some embodiments, the management server nodes 170 comprise stand-alone dedicated management server nodes, which may comprise physical and/or virtual server nodes. In the context of exemplary embodiments for data protection and recovery methods as discussed herein, the management server nodes 170 implement a replication metadata management system 172 which is utilized to configure replication topologies (e.g., full mesh replication) in the data storage system 130 and manage metadata associated with the configured replication topologies, which metadata is used to enable operations of the replication and data recovery control system 152 of the storage control system 150.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 140 and (ii) read requests to access data that is stored in one or more of the storage nodes 140.

The communications network 120 is configured to enable communication between the host systems 110 and the storage nodes 140, and between the management server nodes 170, the host systems 110, and the storage nodes 140, as well as to enable peer-to-peer communication between the storage nodes 140 of the data storage system 130. In this regard, while the communications network 120 is generically depicted in FIG. 1, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniB and, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out data storage system which allows additional storage nodes to be added to the cluster to scale the performance and storage capacity of the data storage system 130. It is to be noted that each storage node 140 and its associated array of storage devices 160 is an example of what is more generally referred to herein as a "storage system" or a "storage array."

In some embodiments, each storage node 140 comprises a server node that is implemented on, e.g., a physical server machine or storage appliance comprising hardware processors, system memory, and other hardware resources that execute software and firmware to implement the functionality of the storage node 140 and storage control system 150. In some embodiments, each storage node 140 comprises a plurality of storage control processors which execute a lightweight operating system (e.g., a customized lightweight Linux kernel) and functional software (e.g., software-defined storage software) to implement various functions of the storage node 140 and storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the cluster, etc.

In a distributed storage environment where the data storage system 130 comprises a cluster of storage nodes 140, the storage control systems 150 of the storage node cluster will communicate in a cooperative manner to process data access requests received from the host systems 110. The data management and storage functions and services implemented by the storage control systems 150 include, but are not limited to, aggregating/pooling the storage capacity of the storage nodes 140, performing functions such as inline data compression/decompression, deduplication, thin provisioning, and data protection functions such as data replication, snapshot, and data protection schemes based on data striping and parity (e.g., RAID), and other types of data management functions, depending on the system configuration.

The storage devices 160 of a given storage node 140 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 160 may be implemented in each storage node 140. In this regard, the term "storage device" as used herein should be broadly construed to encompass all types of persistent storage media including hybrid drives. On a given storage node 140, the storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

As noted above, the data storage system 130 can implement any type of dynamic scale-out storage system in which the number of storage nodes within the storage cluster can change over time. In an exemplary embodiment, the data storage system 130 comprises a dynamic scale-out SAN storage system that is configured to implement a high-capacity block-level storage system architecture which consolidates the capacity of the storage devices 160 (e.g., HDDs, SSDs, PCIe or NVMe flash cards, etc.) of the storage nodes 140 into logical storage volumes (e.g., a block unit of storage management) which are identified by, e.g., logical unit numbers (LUNs). In addition, a logical storage volume can be further divided or partitioned into block units that are identified by LUNs. In the SAN storage system, each storage node 140 within the data storage system 130 executes a lightweight operating system and associated software-defined storage software to implement a software-defined storage environment in which the storage nodes 140 form a loosely coupled storage server cluster in which the storage nodes 140 collectively communicate and operate to create a server-based SAN system (e.g., virtual SAN) to provide host access to a virtual pool of block storage using the combined storage capacity (e.g., local or network storage devices) of the storage nodes 140.

More specifically, in the scale-out SDS environment, the storage control systems 150 of the storage nodes are configured to operate as data storage servers which create and manage storage pools (e.g., virtual pools of block storage) by aggregating storage capacity from their respective storage devices 160 and dividing a given storage pool into one or more volumes, wherein the volumes are exposed to the SDCs 112 of the host systems 110 as block devices. The storage control systems 150 expose abstractions of block devices (e.g., virtual block devices). For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.). In this regard, each instance of the storage control system 150 that runs on a respective one of the storage nodes 140 contributes its local storage space to an aggregated virtual pool of block storage with varying performance tiers (e.g., HDD, SSD, etc.) within a virtual SAN.

While the host systems 110 can communicate over a front-end network (e.g., LAN/WAN), a SAN utilizes a dedicated storage network (e.g., a Fibre Channel fabric, an iSCSI fabric, etc.) to provide an any-to-any connection between the host systems 110 and the storage nodes 140. In this regard, the communications network 120 generically represents such a front-end network and dedicated storage network, although such networks can be integrated into a converged Ethernet network. In particular, in some embodiments, the storage nodes 140 of the data storage system 130 are interconnected in a full-mesh network, wherein back-end interconnectivity between the storage control systems 150 of the storage nodes 140 is achieved using, e.g., a redundant high-speed storage fabric (e.g., 40 Gbps InfiniBand). In some embodiments, the storage nodes 140 utilize remote procedure calls (RPC) for control messages and remote direct memory access (RDMA) for moving data blocks. In some embodiments, the host systems 110 communicate with the storage nodes 140 in a SAN configuration using Ethernet iSCSI and/or Fibre Channel connectivity protocols over the SAN fabric. The SAN fabric comprises SAN networking devices such as SAN switches, routers, protocol bridges, gateway devices, and cables, etc. The SAN network devices move data within the SAN, or between an "initiator" (e.g., an HBA port of, e.g., an application server of a host system 110) and a "target" (e.g., a port of a storage node 140).

In some embodiments, in addition to the storage control systems 150 operating as storage data servers, the software-defined storage environment comprises other components such as metadata managers (MDMs), which execute on the management server nodes 170, and the SDCs 112 which execute on the host systems 110. More specifically, each SDC 112 that executes on a given host system 110 comprises a lightweight block device driver that is deployed to expose shared block volumes to the host systems 110 (e.g., each SDC exposes the storage volumes as block devices to each application residing on the same server (e.g., host system 110) on which the SDC 112 is installed. In some embodiments, as shown in FIG. 1, the SDCs 112 run on the same server machines as the host systems 110 which require access to the block devices exposed and managed by the storage control systems 150 of the storage nodes 140. The SDC 112 of a given host system 110 exposes block devices representing the virtual storage volumes that are currently mapped to the given host system 110. In particular, the SDC 112 for a given host system 110 serves as a block driver for the host system 110, wherein the SDC 112 intercepts I/O requests, and utilizes the intercepted I/O request to access the block storage that is managed by the storage control systems 150. The SDC 112 provides the operating system or hypervisor (which runs the SDC) access to the logical block devices (e.g., volumes). The SDCs 112 have knowledge of which storage data servers (e.g., storage control systems 150) hold its block data, so multipathing can be accomplished natively through the SDCs 112.

The management server nodes 170 in FIG. 1 implement a management layer which manages and configures the network computing environment 100. In some embodiments, the management server nodes 170 comprise a tightly-coupled cluster of metadata manager nodes that are configured to supervise the operations of the storage cluster and manage storage cluster configurations. The metadata manager nodes operate outside of the data path and provide the relevant information to the SDCs 112 and the storage nodes 140 to allow such components to control data path operations. The metadata managers are configured to manage the mapping of SDCs 112 to the storage control systems 150 of the storage nodes 140. The metadata managers manage various types of metadata that are required to perform various management operations in the storage environment such as, e.g., managing configuration changes, managing the SDCs and storage data servers, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

While FIG. 1 shows an exemplary embodiment of a two-layer deployment in which the host systems 110 are separate from the storage nodes 140 and connected by the communications network 120, in other embodiments, a converged infrastructure (e.g., hyperconverged infrastructure) can be implemented to consolidate the host systems 110, the storage nodes 140, and communications network 120 together in an engineered system. For example, in a hyperconverged deployment, a single-layer deployment is implemented in which the SDCs 112 and storage data servers (e.g., storage control systems 150) run on the same nodes (e.g., each node deploys a storage data client and a storage data server) such that each node is a data storage consumer and a data storage supplier. In other embodiments, the system of FIG. 1 can be implemented with a combination of a single-layer and two-layer deployment.

Figure 2:
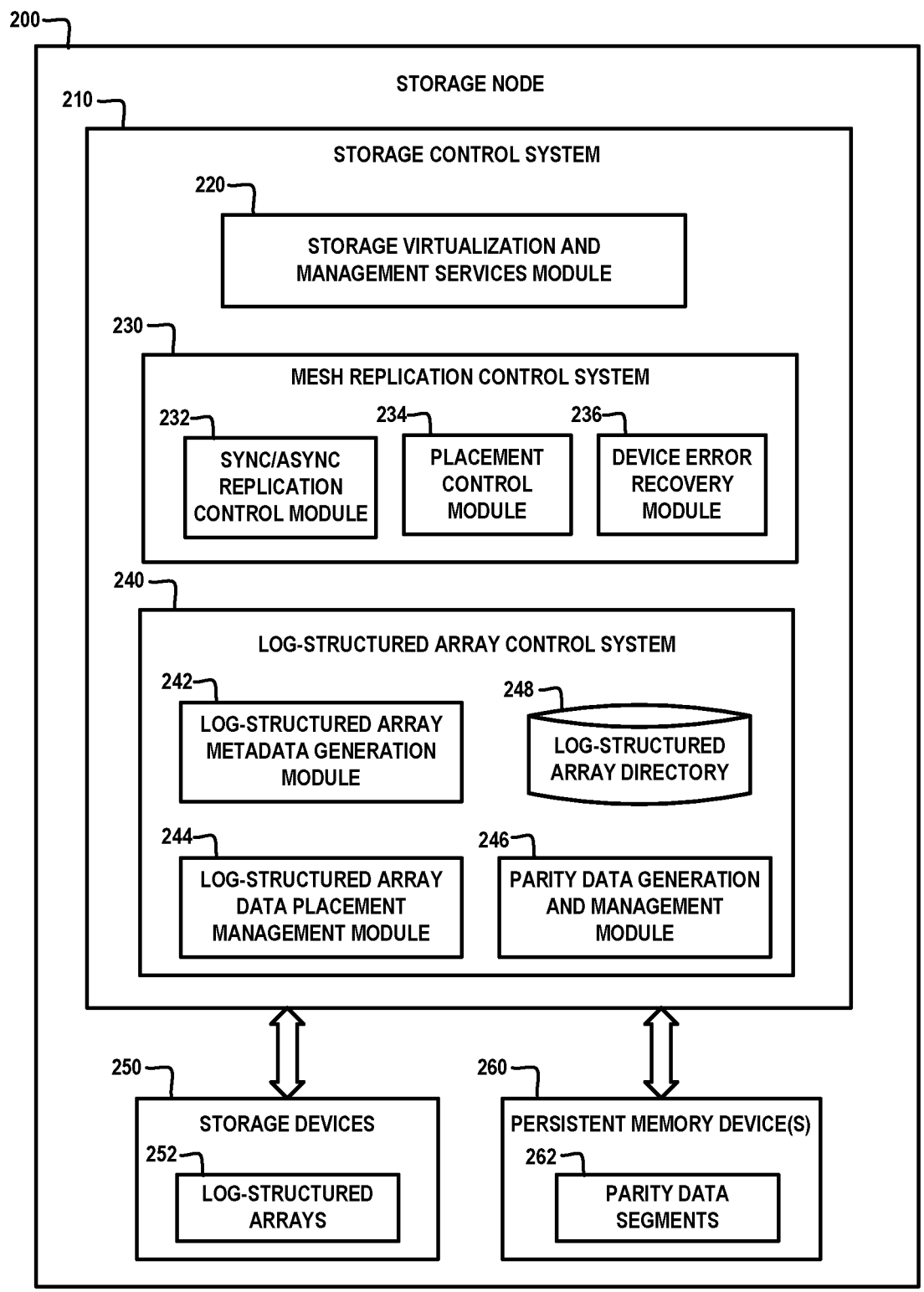
FIG. 2 schematically illustrates a storage node which comprises a storage control system that is configured to enable recovery from partial device errors in a data storage system, according to an exemplary embodiment of the disclosure.

FIG. 2 schematically illustrates a storage node 200 which comprises a storage control system that is configured to enable recovery from partial device errors in a data storage system, according to an exemplary embodiment of the disclosure. In some embodiments, FIG. 2 schematically illustrate an exemplary architecture of the storage nodes 140 of the data storage system 130 of FIG. 1. As shown in FIG. 2, the storage node 200 comprises a storage control system 210 which comprises a storage virtualization and management services module 220, a mesh replication control system 230, a log-structured array control system 240 (referred to hereafter as LSA control system 240), storage devices 250, and one or more persistent memory devices 260. The mesh replication control system 230 comprises a synchronous/asynchronous (sync/async) replication control module 232, a placement control module 234, and a device error recovery module 236. The LSA control system 240 comprises a log-structured array metadata generation module 242, a log-structured array data placement management module 244, a parity data generation and management module 246, and a log-structured array directory 248, the functions of which will be explained in further detail below.

In some embodiments, the storage devices 250 comprise volumes of block storage capacity organized into a plurality of log-structured arrays 252. In some embodiments, one or more of the persistent memory devices 260 have memory allocated to store parity data segments 262 which, as explained in further detail below, are utilized by the device error recovery module 236 to perform partial device error recovery operations. It is to be noted that the storage control system 210 may include additional modules and other components typically found in conventional implementations of storage controllers and storage systems, although such additional modules and other components are omitted for clarity and simplicity of illustration.

The storage virtualization and management services module 220 implements any suitable logical volume management (LVM) system which is configured to create and manage storage volumes by aggregating the storage devices 250 into one or more virtual storage pools that are thin-provisioned for maximum capacity, and logically dividing each storage pool into one or more storage volumes that are exposed as block devices (e.g., raw LUNs) to the host systems 110 and SDCs 112 (FIG. 1). In some embodiments, the storage pools are primarily utilized to group storage devices based on device types and performance. For example, SSDs are grouped into SSD pools, and HDDs are grouped into HDD pools. Furthermore, in some embodiments, the storage virtualization and management services module 220 implements methods to support various data storage management services such as inline data compression/decompression, data protection, data migration, data deduplication, thin provisioning, snapshots, data backups, etc.

The mesh replication control system 230 implements methods that are configured to perform data replication operations using a mesh replication topology. The sync/async replication control module 232 is configured to control data replication operations in which the replication of primary data stored in the storage devices 250 is performed synchronously or asynchronously, depending on the application. In particular, synchronous replication generally involves writing data to both a source (primary) volume and a destination (replica) volume before acknowledging completion of the I/O write operation to a host application. In this regard, synchronous replication is utilized for applications which require the primary data and the replica data to remain synchronized in real-time to provide high availability of critical systems or applications. In the event of a failure at the primary site, applications can failover to a remote site and resume operation with assurance of zero data loss. On the other hand, asynchronous replication generally involves writing data to the source volume, and acknowledging completion of the I/O write operation to the host application before the data is replicated to the destination volume. With asynchronous replication, the I/O write operations at the source site can be logged in a replication journal, and the replication journal is periodically transmitted at scheduled times to a destination site which processes the replication journal to replicate the data to the destination volume.

Figure 3:
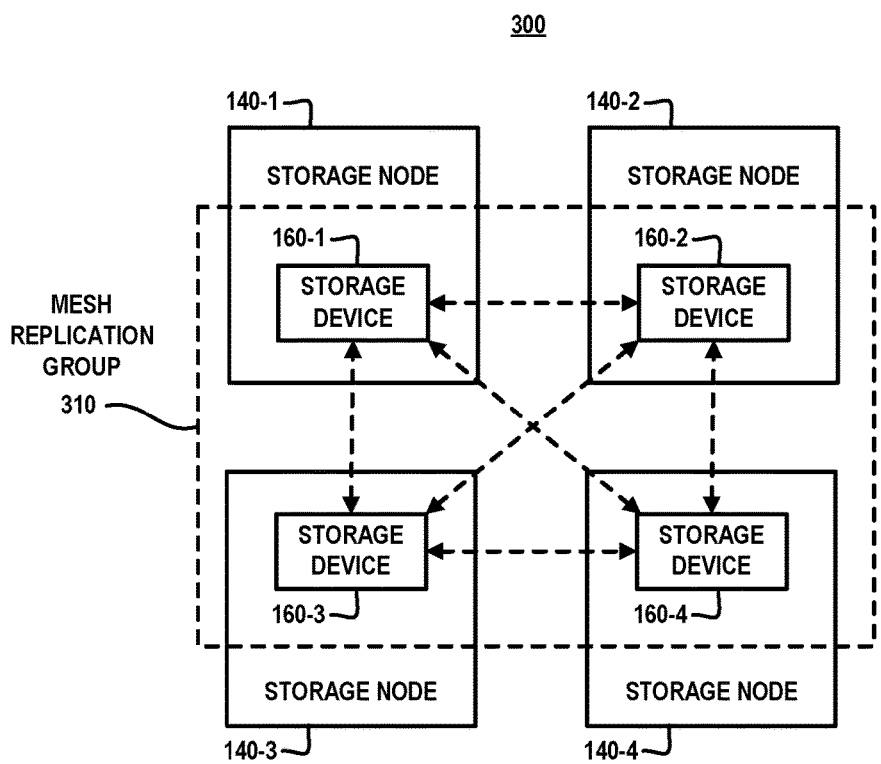
FIG. 3 schematically illustrates a mesh replication topology which can be implemented in the data storage system of FIG. 1, according to an exemplary embodiment of the disclosure.

The placement control module 234 is configured to manage the placement of replica data blocks in other storage devices of remote storage nodes that are part of replication groups within a mesh replication topology. For example, FIG. 3 schematically illustrates a mesh replication topology 300 which can be implemented in the data storage system of FIG. 1, according to an exemplary embodiment of the disclosure. The mesh replication topology 300 comprises four different storage nodes 140-1, 140-2, 140-3, and 140-4 and respective storage devices 160-1, 160-2, 160-3, and 160-4, which are part of a replication group 310. In this exemplary scheme, data protection for every storage device 160-1, 160-2, 160-3, and 160-4 within the replication group 310 is distributed across all other eligible storage devices within the replication group 310, which reside in the different storage nodes 140-1, 140-2, 140-3, and 140-4 of the data storage system.

In particular, each storage device 160-1, 160-2, 160-3, and 160-4 in the replication group 310 can store respective primary data blocks, and have replica data blocks stored in every other storage device within the replication group 310, which reside on other storage nodes. For example, the storage node 140-1 can store primary data blocks in the storage device 160-1, and store replicas of the primary data blocks in any of the storage devices 160-2, 160-3, and 160-4 of the respective storage nodes 140-2, 140-3, and 140-4. In some embodiments, only one replica of given block of primary data stored in the storage device 160-1 is stored in one of the storage devices 160-2, 160-3, or 160-4, but replicas of other primary data blocks in the storage device 160-1 can be stored in any of the storage devices 160-2, 160-3, or 160-4. By way of example, assume that first, second, and third primary data blocks are stored in the first storage device 160-1, then first, second and third replica data blocks of the respective first, second, and third primary data blocks can be stored in the data storage devices 160-2, 160-3, and 160-4, respectively, of the replication group 310.

An advantage of using a full mesh replication topology in this instance is that replication operations can still be performed even when a given one of the storage nodes 140-1, 140-2, 140-3, and 140-4 crashes or otherwise drops off-line and is not accessible. Moreover, as noted above, a mesh replication protection scheme provides for rebuild rates that are linearly proportional to the system size (e.g., size of replication group) since upon error or failure of a given storage device in a given replication group, the other functional storage devices in the given replication group can concurrently participate in the rebuild process. It is to be understood that while the exemplary embodiment of FIG. 3 shows a mesh replication topology with four storage devices of four different storage nodes, a mesh replication group can include more than four storage devices and separate storage nodes.

Referring back to FIG. 2, the device error recovery module 236 implements methods that are configured to enable recovery of missing data as a result of storage device errors. The device error recovery module 236 of the mesh replication control system 230 communicates with the mesh replication control systems of other storage nodes to enable rebuild and recovery of missing data as a result of a device error of (i) a local storage device 250 of the storage node 200 or (ii) a remote storage device of another storage node. As explained in further detail below, the device error recovery module 236 implements rebuild and recovery methods that are configured to fix local errors on the local storage devices 250 when, e.g., a local error on a given local storage device is encountered, without having to resort to a full device rebuild as if a full device error occurred. In some embodiments, the device error recovery module 236 implements data protection and recovery methods as discussed in further detail below in conjunction with FIGS. 5, 6, 7A, 7B, and 8.

Figure 4:
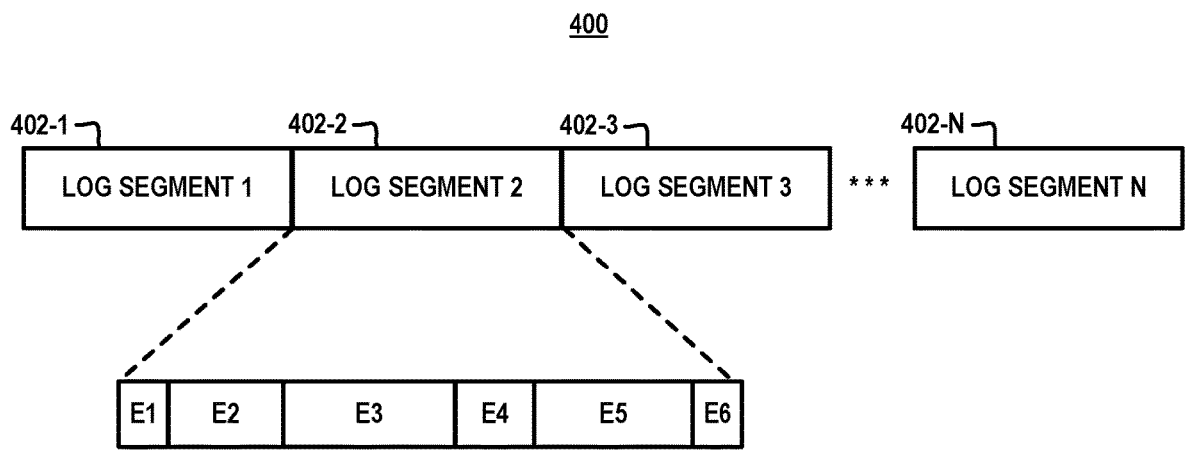
FIG. 4 schematically illustrates a log-structured array which can be generated and managed by the storage control system of FIG. 2, according to an exemplary embodiment of the disclosure.

The LSA control system 240 creates and manages the log-structured arrays 252 within block storage capacity (e.g., volumes) of the storage devices 250. More specifically, the LSA control system 240 is configured to organize at least portions of the block storage capacity of one or more of the storage pools/volumes of the storage devices 250 into a LSA architecture in which data is stored (in compressed form and/or non-compressed form) in log segments of the log-structured arrays 252 according to an LSA data placement scheme. For example, FIG. 4 schematically illustrates a log-structured array 400 which can be generated and managed by the storage control system 210 of FIG. 2, according to an exemplary embodiment of the disclosure. The log-structured array 400 comprises an array of N log segments 402-1, 402-2, 402-3, . . . , 402-N (collectively, or individually referred to as log segments 402). In some embodiments, the log-structured array 400 is allocated from the block storage capacity of one or more storage devices 250. The block storage capacity of each storage device is divided into a plurality of logical data blocks (e.g., fixed-size allocation units), wherein each logical data block comprises a separately addressable unit of the physical storage space with a specified block size (e.g., allocation unit size). Each logical data block (e.g., allocation unit) comprises a same number of one or more physical data blocks of the underlying storage media.

More specifically, as is known in the art, the storage space of a storage device is organized into fixed-size addressable storage units (referred to as allocation units). The "allocation unit size" or "cluster size" of a given storage device is defined by the file system or operating system kernel when formatting the given storage device. An allocation unit represents the smallest logical block size of storage space that can be used to hold data and which is addressed as one logical unit by the operating system. Each logical block has the same "allocation unit size" which corresponds to a specific number of bytes of physical disk space. For example, for SSDs, the smallest addressable storage unit is a "page" wherein common page sizes are, e.g., 2 KB, 4 KB, 8 KB, or 16 KB. The pages of an SSD are aggregated into blocks, e.g., 128 or 256 pages per block. For HDDs, the smallest addressable storage unit is a "logical data block" which is uniquely addressed using a corresponding logical block address (LBA). In HDDs, a logical block size (e.g., 4 KB) can be equal to the physical sector size, or the logical block size can be a multiple of the physical sector size such that each logical block corresponds to a block of physical sectors. For example, for a physical sector size of 512 bytes, a logical block size can be 8×512 bytes=4096 bytes.

In the LSA layout, each log segment 402 of the log-structured array 400 comprises a set of contiguous logical data blocks of the physical block storage space. The log segments 402 can reside in the same storage device or be distributed over multiple storage devices on a given storage node. In some embodiments, the log segments 402 are equal in size (e.g., the log segments 402 each include the same number of logical data blocks). For example, assuming that each logical block of a given storage device (e.g., cluster of sectors on HDD, or page of SSD) is 4 KB, and that each log segment 402 has a segment size of 256 KB, then each of the N log segments 402 comprises a consecutive sequence of 64 logical data blocks within the LSA storage space.

Whenever a user-offset is written to a logical block address, the data is placed in a given log segment 402 which has enough vacancy to host the data. For example, when new data is written to LSA storage, the new data is appended to the end of a given log segment 402 which has sufficient space. In addition, metadata comprising log indexing information and other types of metadata are also appended to the given log segment 402 when data is written to the given log segment 402. In this regard, each log segment 402 will include a sequence of appended data entries comprising data items and metadata items. For example, as schematically illustrated in FIG. 4, the log segment 402-2 is shown to comprise log data entries E1, E2, E3, E4, E5, and E6, wherein each data entry comprises a data item and an associated metadata item.

The log-structured array metadata generation module 242 (hereafter referred to as LSA metadata generation module 242) is configured to generate log metadata which is included in metadata items that are appended to associated data items which are stored in the log segments of the log-structured arrays 252. The log metadata items within the log segment comprise indexing information (e.g., pointers) which is used to provide fast random access to data entries within the log segments, as well as information that describes the data items (e.g., valid, not valid, compressed, uncompressed, etc.) within the log segment, and other information such as checksums for error detection, etc. The type of information and data structures that are used to implement the log metadata will vary depending on the application.

The log-structured array directory 248 (hereafter referred to as LSA directory 248) stores mapping information which maps logical block addresses to physical block addresses of log entries within the log-structured arrays 252. In some embodiments, the LSA directory 248 is maintained in non-volatile system memory. In some embodiments, the logical block addresses of logical devices are mapped to physical data entries in the log-structured array 252. The LSA directory 248 provides information that maps each logical block address to a current block location in the log-structured arrays 252. For example, an entry in the LSA directory 248 for a given logical block provides information such as (i) the physical ID and location of the log segment which stores the logical block, (ii) the starting location in the log segment (offset), (iii) the length in physical device units (e.g., sectors) to which the logical block is mapped, etc. The LSA directory 248 can be implemented using any suitable type of directory data structure and directory implementation algorithm. For example, in some embodiments, the LSA directory 248 can implement a hash table which comprises key-value pairs, as is known in the art. In some embodiments, the directory information within the LSA directory 248 is utilized to determine the location of a given log segment that holds the data of a given logical block, while the metadata indexing entries within the given log segment are utilized to determine the location of corresponding data items within the log segment.

In a compression-enabled data storage system, the log-structured array data placement management module 244 (hereafter, referred to as LSA data placement management module 244) implements methods for, e.g., storing both compressed and non-compressed data entries within log segments of the log-structured arrays 252 in a way that minimizes I/O amplification (e.g., read amplification and write amplification). For example, when the LSA control system 240 receives an I/O write request to write some block of data to LSA storage which is deemed to be "incompressible" (i.e., a minimal predefined threshold level of data compression cannot be obtained for the I/O write data), the LSA data placement management module 244 will store the I/O write data in its original non-compressed form for several reasons. For example, storing the I/O write data in its original non-compressed form avoids storing excess data in instances where the data compression yields compressed data with a compressed data size that is greater than the original data size. In addition, storing such incompressible I/O write data in its original form eliminates the computational processes and resources needed to decompress the data when read from storage. In addition, when a modified data block comprising non-compressed data is rewritten to LSA storage, the modified data block is written to the same log entry location(s) as the original data (referred to as "in-place update"). In this regard, the storage of non-compressed data allows for in-place updates of rewritten data (which minimizes the number of invalid entries in the log segments, and thus reduces fragmentation) and reduces the I/O amplification associated with defragmentation cycles when valid data entries with non-compressed data are not relocated during a defragmentation process. On the other hand, when a modified data block comprising compressed data is rewritten to the LSA storage, the modified data is written to one or more new log entry locations in a log segment which have vacancy (referred to as "out-of-place update"), wherein an out-of-place update invalidates the original compressed data that is held in one or more existing log entries.

While not specifically shown in FIG. 2, the LSA control system 240 implements methods for defragmenting log segments within the log-structured arrays 252. The physical location of data within log segments of the log-structured arrays 252 will change over time as a result of out-of-place writes that are performed by the LSA data placement management module 244 when, e.g., writing modified blocks of compressed data to new log entries that are appended to the end of a given log segment. The out-of-place writes result in invalid blocks of data which cannot be reused until they are reclaimed. In addition, due to the runtime variation of data compressibility, some or all log data entries that contain compressed data can have unused storage space that remains after filling the data entries with compressed data. The invalid data entries (and their corresponding metadata entries) together with the unused space in data entries with compressed data, collectively form "gaps" in the log segments. The LSA defragmentation control process periodically performs a defragmentation process to consolidate such "gaps" into free storage space within the log segments that can be used to store new data. A defragmentation process involves rewriting a large portion of a log segment, or the entire log segment, after packing the valid log data entries together, such that all gaps in the log segment are closed, and all vacant regions of the log segment become contiguous.

The parity data generation and management module 246 implements methods that are configured to generate and manage parity data for groups of data segments (e.g., log segments) stored in the local storage devices 250. The parity data is utilized by the device error recovery module 236 to recover missing data that results from, e.g., partial device error of one or more of local segments (e.g., log segments) in the local storage devices 250. In some embodiments, segments of parity data are stored in log segments of the log-structured arrays 252 in the storage devices 250. In some embodiments, as shown in FIG. 2, the segments of parity data 262 are stored in one or more of the local persistent memory devices 260. In some embodiments, local data recovery and rebuild methods are configured to utilize the local parity data segments to recover missing data, without having to access replica copies of the missing data from other storage devices within a given replication group. In some embodiments, local data recovery and rebuild methods are configured to utilize the local parity data segments to efficiently identify the missing/corrupted data items in a given log segment, and then recover the missing/corrupted data items using replica copies of the missing/corrupted data in the mesh replication system, rather than relying solely on the replica copies to perform a full device rebuild operation when a relatively small local region of the storage device has failed or become corrupted. Various data protection methods for utilizing local parity data segments and replication copies to recover from partial device errors will now be described in further detail in conjunction with FIGS. 5, 6, 7A, 7B, and 8.

Figure 5:
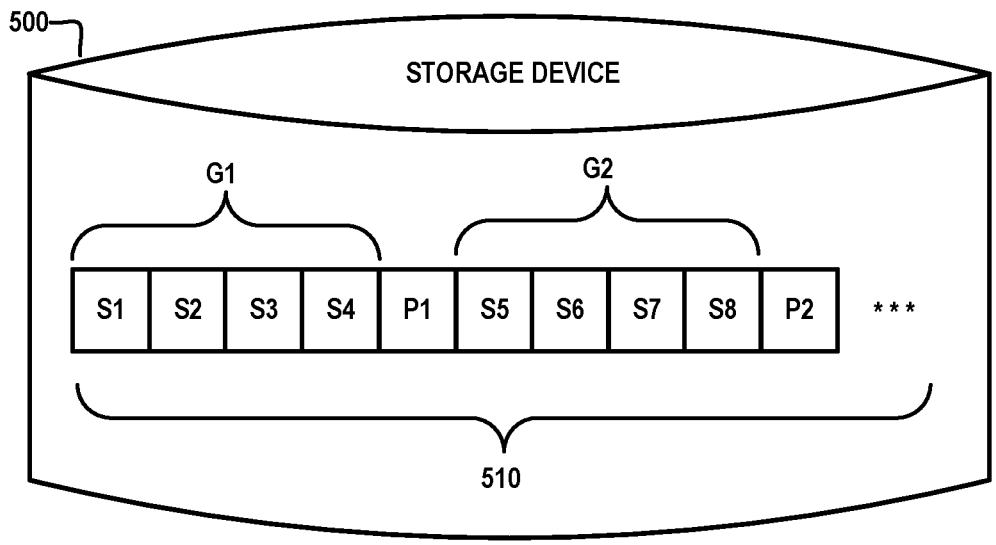
FIG. 5 schematically illustrates a method for utilizing local parity data to recover from a partial device error, according to an exemplary embodiment of the disclosure.

FIG. 5 schematically illustrates a method for utilizing local parity data to recover from a partial device error, according to an exemplary embodiment of the disclosure. More specifically, FIG. 5 schematically illustrates a storage device 500 (e.g., SSD, HDD, etc.) having block storage 510 that is partitioned into a plurality segments including data segments S1, S2, S3, S4, S5, S6, S7, S8, etc., and parity data segments P1, P2, etc. In some embodiments, the block storage 510 comprises a log-structured array, wherein each data segment S1, S2, S3, S4, S5, S6, S7, S8, etc., and each parity data segment P1, P2, etc., comprises a log segment of a given log-structured array that is logically created in the storage device 500.

In the exemplary data protection scheme of FIG. 5, a parity data segment is generated for each group of n data segments (e.g., log segments). For example, in some embodiments, a parity data segment is generated for every four (4) data segments. In particular, as shown in FIG. 5, a first parity data segment P1 is generated for a first group G1 of data segments (e.g., segments S1, S2, S3, and S4), and second parity data segment P2 is generated for a second group G2 of data segments (e.g., segments S5, S6, S7, and S8). In some embodiments, each parity data segment P1 and P2 is generated using any suitable parity computing function to compute parity data based on the data segments within the respective groups. For example, in some embodiments, the parity data is computed using an eXclusive OR (XOR) function, wherein a given parity data segment (e.g., parity data segment P1) is computed by XORing the data segments (e.g., data segments S1, S2, S3, S4) within the associated segment group (e.g., segment group G1).

In some embodiments, the data protection scheme of FIG. 5 is conceptually similar to a RAID (Redundant Array of Independent Drives) technique, such as a RAID 5 technique, in which each segment group (e.g., G1, G2, etc.) can be considered a "resiliency unit" (commonly referred to as "stripe") and wherein each resiliency unit (e.g., stripe) is divided into equal-sized data blocks (referred to as "strips"). In the exemplary embodiment of FIG. 5, each data segment S1-S8 (e.g., log segment of an LSA storage system) can be deemed a strip. In some embodiments of the data protection scheme of FIG. 5, each data segment within a segment group is stored on the same storage device, but not necessarily in a contiguous manner as shown in FIG. 5.

With the exemplary data protection scheme of FIG. 5, if a given data segment (or a portion of a given data segment) within a given segment group is lost or corrupted, the missing data item(s) within the given data segment can be recovered using the other (non-corrupted) data segments and the associated parity data segment. For example, assume that a portion of the data segment S1 (or the entire data segment S1) has been corrupted, the data segment S1 can be recovered/rebuilt by performing an XOR computation using the non-corrupted data segments S2, S3, and S4, and the parity data segment P1, as is understood by those of ordinary skill in the art. In this instance, the local partial error recovery process does not require accessing replica copies of the missing data items from other storage devices within the replication group to recover from the local partial device error.

With the exemplary local RAID 5 data protection scheme of FIG. 5, it is advantageous to limit the number of data segments that are included in each segment group for several reasons. For example, once a local error is identified (e.g., lost data) in a given data segment, it is desirable to quickly recover the lost data and limit any adverse impact on the data storage system. Furthermore, smaller segment groups will have a lower probability to sustain more than one error, which can prevent local recovery in instances where, e.g., two or more local data segments of a given segment group are concurrently corrupted and only one parity data segment is generated for each segment group. While the exemplary embodiment of FIG. 5 shows that each segment group G1 and G2 comprises groups of neighboring (contiguous) data segments, it is to be understood that in other embodiments, depending on the media error characteristics, different grouping schemes can be implemented to yield better results.

In some embodiments, the parity data segment (e.g., P1) for a given segment group (e.g., G1) is updated each time (i) a new data item is stored or (ii) an existing data item is updated in at least one data segment (e.g., S1, S2, S3 or S4) of the given segment group (e.g., G1). The parity data segment for a given segment group can be updated using various techniques. For example, in some embodiments, if one or more data segments within a given segment group are updated, the parity data segment for the given segment group can be updated by, e.g., XORing all the data segments within the segment group to compute a new parity data segment for the given segment group.

In other embodiments, if a given data segment within a given segment group is updated (e.g., new data item is written, or existing data item is updated, etc.), the parity data segment for the given segment group can be updated by a process which is illustrated as follows. For example, in the exemplary embodiment of FIG. 5, assume that the data segment S2 of the first segment group G1 is being updated. The corresponding parity data segment P1 is updated as follows. The previous (old) data segment S2 is read from the storage device and temporarily stored in memory. The new/updated data segment S2 is then XOR'd with the old data segment S2 to generate an intermediate parity data segment. The old parity data segment P1 is accessed (e.g., read from the storage device or read from persistent memory), and the old parity data segment P1 is XOR'd with the intermediate parity data segment to thereby generate the new/updated parity data segment P1. The new/updated data segment S2 and new/updated parity data segment P are stored.

Figure 6:
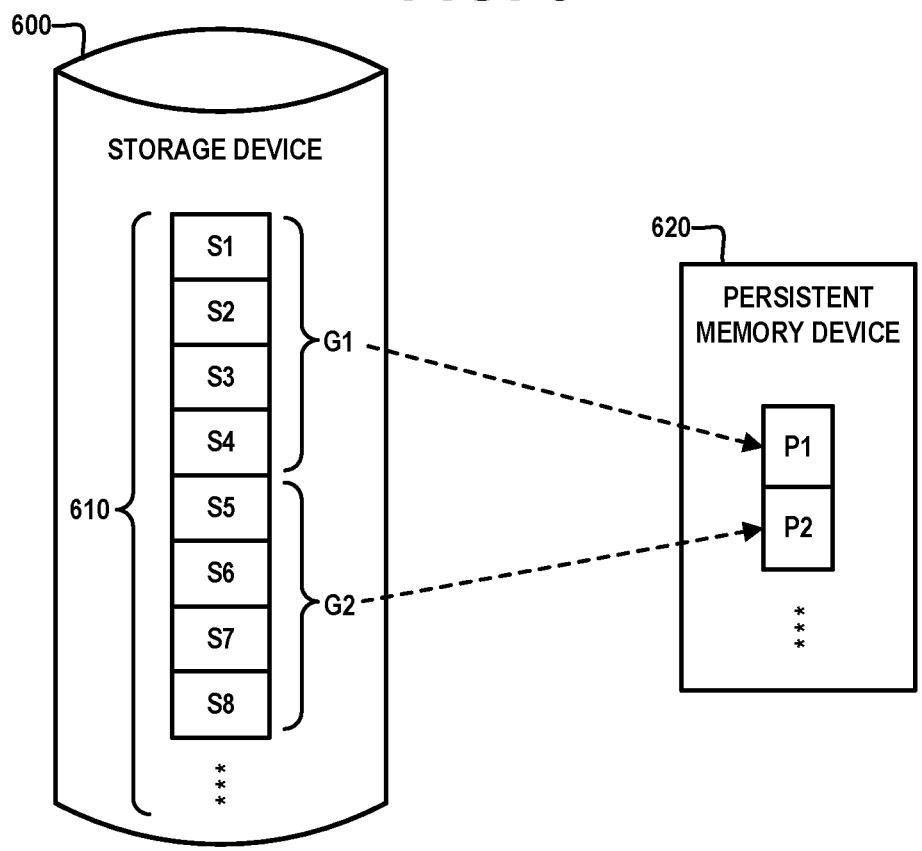
FIG. 6 schematically illustrates a method for utilizing local parity data to recover from a partial device error, according to another exemplary embodiment of the disclosure.

FIG. 6 schematically illustrates a method for utilizing local parity data to recover from a partial device error, according to another exemplary embodiment of the disclosure. FIG. 6 illustrates a data protection scheme which is similar to the exemplary local RAID 5 data protection scheme of FIG. 5, except that in the exemplary embodiment of FIG. 6, the parity data segments are stored in a persistent memory device as opposed to being stored with the data segments in the storage device. More specifically, FIG. 6 schematically illustrates a storage device 600 (e.g., SSD, HDD, etc.) having block storage 610 that is partitioned into a plurality segments (e.g., LSA log segments) including data segments S1, S2, S3, S4, S5, S6, S7, S8, etc., which are grouped into segment groups G1, G2, etc. In addition, as shown in FIG. 6, the parity data segments P1 and P2, which are generated for the respective segment groups G1 and G2, are stored in a persistent memory device 620.

In some embodiments, the persistent memory device 620 is located on the same server node (e.g., storage node) as the storage device 600. The persistent memory device 620 can be implemented using any suitable persistent memory technology, such as a NVDIMM (nonvolatile dual in-line memory module), or other types of solid-state high-performance byte-addressable memory devices which enable high-speed, low-latency access to the parity data segments.

The use of the persistent memory device 620 to persistently store the parity data segments P1, P2, etc., reduces the write overhead associated with the storage device 600 when storing new/updated data segments on the storage device 600, which also requires the computation and storage of updated parity data segments. In FIG. 6, the storing of the parity data segments P1, P2, etc., in the persistent memory device 620 (rather than the storage device 600) provides performance advantages such as (i) reducing the write overhead (e.g., write amplification) of the storage device 600 (e.g., SSD, flash storage, etc.), and (ii) providing faster access and processing of the parity data segments, which results in reduced latency in local data recovery/rebuild operations. In other words, the use of the persistent memory device 620 to store the parity data segments enables fast access operations (data read and write operations) for the parity data, and serves to offload the I/O for the parity operations from the storage device 600 which prolongs the endurance of the storage device 600.

Figure 7A:
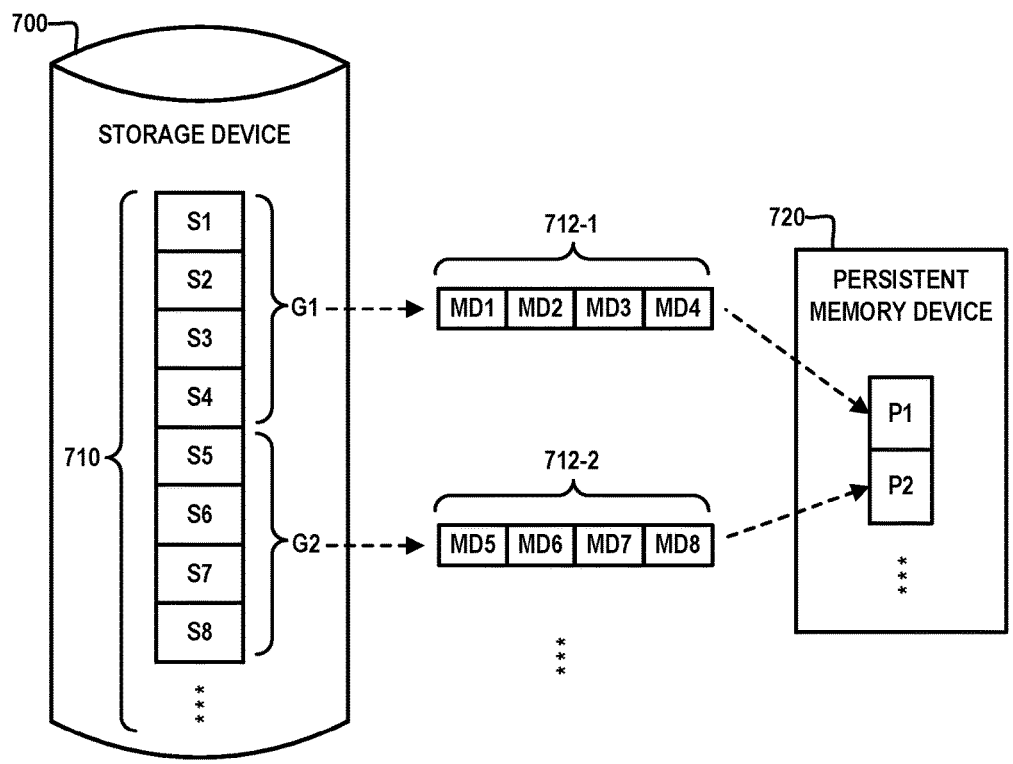
FIGS. 7A and 7B schematically illustrate a method for utilizing local parity data to recover from a partial device error, according to another exemplary embodiment of the disclosure.
Figure 7B:
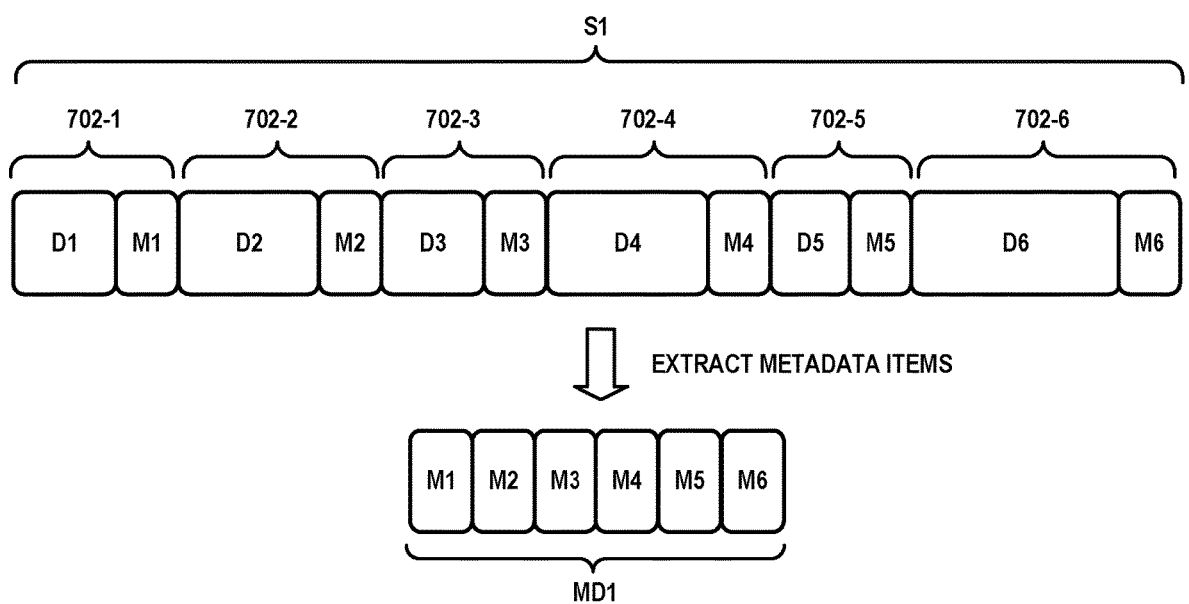

FIGS. 7A and 7B schematically illustrate a method for utilizing local parity data to recover from a partial device error, according to another exemplary embodiment of the disclosure. More specifically, FIGS. 7A and 7B schematically illustrate a data protection and recovery scheme which is similar to the exemplary local RAID 5 data protection scheme of FIG. 6, except that in the exemplary embodiment of FIGS. 7A and 7B, the parity data segments (which are stored in persistent memory) only store parity data of the metadata items associated with the data items included in the log segments, as opposed to storing the parity data of both the data items and the metadata items of the log segments. More specifically, FIG. 7A schematically illustrates a storage device 700 (e.g., SSD, HDD, etc.) having block storage 710 that is partitioned into a plurality segments (e.g., LSA log segments) including data segments S1, S2, S3, S4, S5, S6, S7, S8, etc., which are grouped into segment groups G1, G2, etc. As further shown in FIG. 7A, parity data segments P1 and P2, which are generated for the respective segment groups G1 and G2, are stored in a persistent memory device 720. In contrast to the exemplary data protection schemes of FIGS. 5 and 6, the parity data segments P1, P2, etc. (in FIG. 7A) for the respective segment groups G1, G1, etc., are computed over blocks of metadata that are extracted from the data segments within the given group.

More specifically, as schematically shown in the exemplary embodiment of FIG. 7A, a first block of metadata 712-1 is extracted from the segments S1, S2, S3, and S4 of the first segment group G1, and a second block of metadata 712-2 is extracted from the segments S5, S6, S7 and S8 of the second segment group G2. The first block of metadata 712-1 comprises blocks of metadata items MD1, MD2, MD3, and MD4, which are extracted from the respective segments S1, S2, S3, and S4. The parity data segment P1 is computed for the first block of metadata 712-1 by, e.g., performing an XOR operation over the blocks of metadata items MD1, MD2, MD3, and MD4. Similarly, the second block of metadata 712-2 comprises blocks of metadata items MD5, MD6, MD7, and MD8, which are extracted from the respective data segments S5, S6, S7, and S8. The parity data segment P2 is computed for the second block of metadata 712-2 by, e.g., performing an XOR operation over the blocks of metadata items MD5, MD6, MD7, and MD8.

FIG. 7B schematically illustrates a process of extracting a block of metadata items from a data segment. For ease of explanation, FIG. 7B illustrates a data segment (e.g., S1) which comprises a plurality of data entries 702-1, 702-2, 702-3, 702-4, 702-5, and 702-6, wherein each data entry comprises a respective data item D1, D2, D3, D4, D5, and D6, and a respective metadata item M1, M2, M3, M4, M5, and M6. The metadata items M1, M2, M3, M4, M5, and M6 comprise various types of information associated with the respective data items D1, D2, D3, D4, D5, and D6. For example, the metadata items within a given data segment (e.g., log segment) include information which includes, but is not limited to, the identity of the respective data items, the sizes of the data items, the offset locations of the data items within the given data segment, locations where replica copies of the data items reside, etc.

The metadata items M1, M2, M3, M4, M5, and M6 are extracted from the data segment S1 and grouped (in a memory buffer) to provide the block of metadata items MD1, which is used in conjunction with the blocks of metadata items MD2, MD3, and MD4 (which are extracted from the respective segments S2, S3, and S4) to compute the parity data segment P1. While FIG. 7B illustrates an exemplary embodiment in which the metadata items M1-M6 for the given data segment S1 (e.g., log segment) are stored in locations adjacent to the associated data items D1-D6, in other embodiments, the metadata items M1-M6 for the given data segment S1 are stored contiguously, and appended to either the front or the end of the given data segment S1 (e.g., the metadata block 712-1 is stored in the front or the end of the segment S1). In such embodiments, the metadata block 712-1 of metadata items M1-M6 can be more readily accessed from the segment S1 and stored in a memory buffer for processing (e.g., update parity).

As demonstrated above, FIGS. 7A and 7B schematically illustrates a data protection scheme that is configured to protect the metadata items of data segments, and not the actual data items of the data segments. Indeed, rather than computing parity across the entirety of the data segments (e.g., segments S1, S2, S3, S4) within a given segment group (e.g., segment group G1), the parity data is computed across the metadata items of the data segments, and the parity data segments (for the metadata items) are stored in the persistent memory 720, which requires less storage space for persistently storing the parity data segments as compared to the data protection schemes of FIGS. 5 and 6.

More specifically, for the data protection schemes of FIGS. 5 and 6, the size of the parity data segments is equal to the size of the data segments. For example, if the size of each data segment (e.g., data segments S1-S8) is 256 KB, then the size of each parity data segment (e.g., parity data segments P1 and P2) will be 256 KB. On the other hand, the size of each block of metadata items MD1, MD2, MD3, and MD4 is significantly smaller (e.g., 12 KB) than the size of the data segments. As such, the size of each parity data segment P1, P2, etc., in FIG. 7A will be smaller than the size of the parity data segments in FIGS. 5 and 6. In this regard, the amount of memory that would be needed to store the parity data segments P1, P2, etc., in the persistent memory 720 of FIG. 7A is significantly less than the amount of memory that would be needed to store the parity data segments in persistent memory for the data protection schemes of FIGS. 5 and 6. Moreover, given the smaller size of the parity data segments in FIG. 7A, the number of I/O operations that would be needed to access the parity data segments from the persistent memory 720 to perform parity update and partial device recovery operations would be less than the number of I/O operations needed to access the parity data segments from persistent memory in the data protection schemes of FIGS. 5 and 6.

Figure 8:
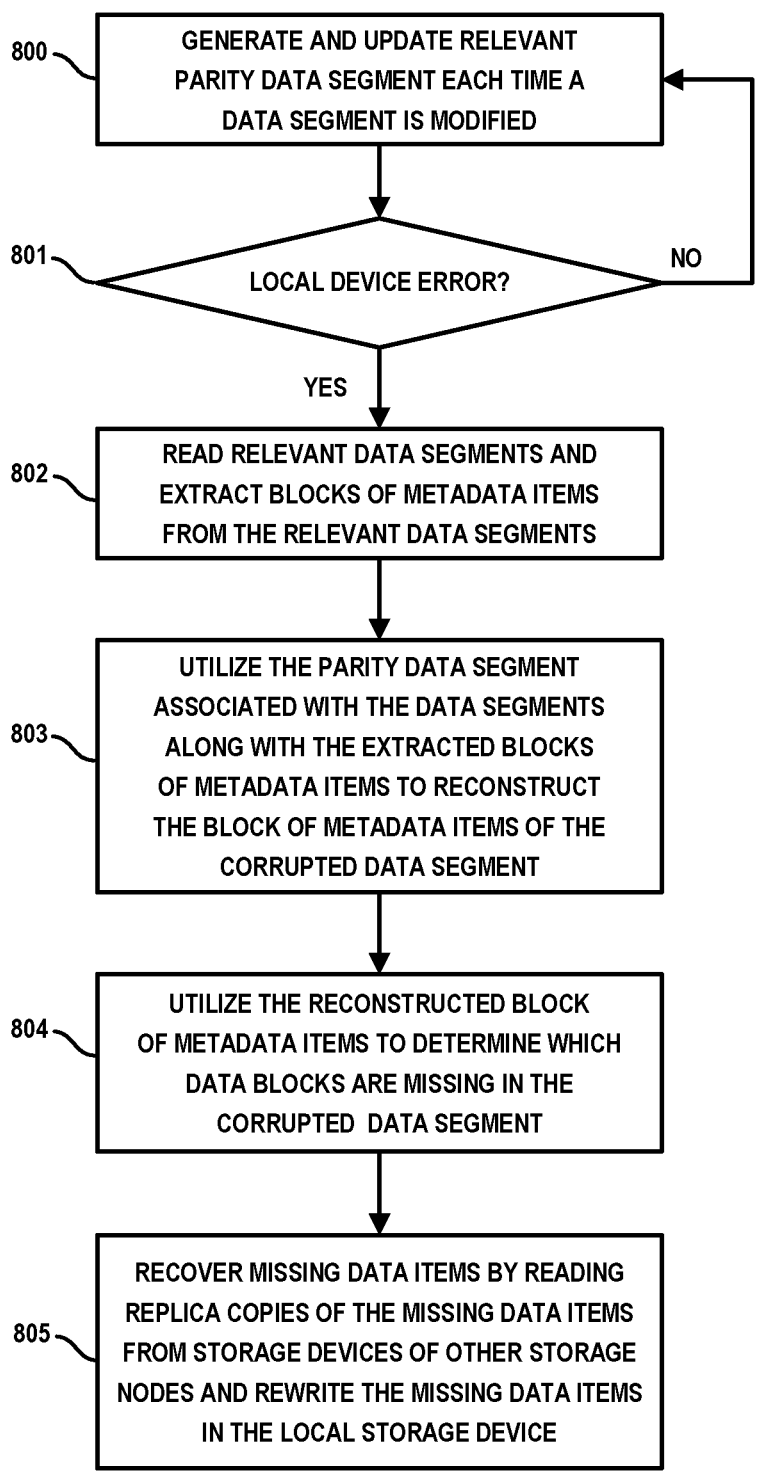
FIG. 8 is a flow diagram which illustrates a method for utilizing local parity data to recover from a partial device error, according to an exemplary embodiment of the disclosure.

FIGS. 7A and 7B illustrate a data protection scheme which is configured to protect the local metadata of the segments, and to enable local data recovery and rebuild operations, as shown in FIG. 8. In particular, FIG. 8 is a flow diagram which illustrates a method for utilizing local parity data to recover from a partial device error, according to an exemplary embodiment of the disclosure. As explained below, FIG. 8 illustrates a data recovery and rebuild process which involves (i) utilizing parity data segments (or metadata parity) to recover missing/corrupted metadata of a given data segment (e.g., recover missing metadata items of the given data segment), (ii) utilizing the recovered metadata to identify missing/corrupted data items in the given data segment, (iii) accessing replica copies of the missing/corrupted data items from remote storage devices (within a given replication group) to thereby recover the missing/corrupted data items, and (iv) locally rebuilding the given data segment using the replica copies of the missing/corrupted data items. In some embodiments, FIG. 8 illustrates a method which is implemented by the device error recovery module 236 of the storage control system 210 of FIG. 2 to utilize metadata parity segments to recover missing metadata of a given data segment, and utilize replica copies of missing data items to locally rebuild the given data segment.

Referring to FIG. 8, during normal operation, the storage control system 210 will generate and update a relevant parity data segment (e.g., metadata parity segment) each time a data segment (which is stored in a local storage device) is modified (block 800). For example, in an LSA storage system, a log segment may be modified by, e.g., the addition of one or more new data entries in the log segment, the deletion of one or more data entries from the log segment, or an update of one or more existing data entries in the log segment. When the given log segment within a given segment group is updated, the parity data segment (e.g., metadata parity segment) for the given segment group can be updated using a process such as described above, and explained hereafter.

For example, in the exemplary embodiment of FIGS. 7A and 7B, assume that the data segment S1 of the first segment group G1 has been modified (e.g., data item D6 and corresponding metadata item M6 are updated). Since the data segment S1 is part of the first segment group G1, the corresponding parity data segment P1 can be updated as follows. The previous (old) metadata items M1, M2, M3, M4, M5, and M6 of the data segment S1 are read from the data storage device 700, virtually grouped together, and temporarily stored in a memory buffer (e.g., DRAM) as the previous block (group) of metadata items MD1. The modified block of metadata items MD1 (e.g., with the metadata item M6 updated) is then XOR'd with the previous (old) block of metadata items MD1 to generate an intermediate parity data segment. The old parity data segment P1 is accessed (e.g., read from the persistent memory device 720) and stored in the memory buffer, and the old parity data segment P1 is XOR'd with the intermediate parity data segment to thereby generate the updated parity data segment P1. The modified data segment S1 and the updated parity data segment P1 are stored in the storage device 700 and the persistent memory device 720, respectively. A replication operation is then performed to replicate the updated data item D6 to another storage device within a replication group.

The data and parity update operations continue during normal operation of the local storage device when no device errors are detected by the storage control system (negative determination in block 801). When the storage control system detects a local device error (affirmative determination in block 801), a local data recovery operation is performed to recover missing data. For example, a device error (e.g., partial device error) can be determined to exist in response to an I/O error which may occur when, e.g., a block of physical data locations of the local storage device have failed, or data stored in a given logical block has been corrupted, etc. In response to the detection of the local device error, the storage control system will access the relevant data segments from the local storage device and extract blocks of metadata items from the relevant data segments (block 802).

By way of example, referring to the exemplary embodiment of FIG. 7A, assume that at least a portion of the data segment S1 is deemed to be corrupted. In this regard, it can be assumed that at least some or all of the metadata items M1-M6 (FIG. 7B) of the data segment S1 are corrupted. Since the corrupted data segment S1 is part of the segment group G1, the relevant data segments S2, S3, and S4 will be accessed, and the respective blocks of metadata items MD2, MD3, and MD4 will be extracted from the respective data segments S2, S3, and S4. The storage control system 210 will access the parity data segment (e.g., P1) from the persistent memory device, which is associated with the data segment group G1, and utilize the parity data segment P1 along the extracted blocks of metadata items MD2, MD3, and MD4 to reconstruct the block of metadata items MD1 associated with the corrupted data segment S1 (block 803). For example, in some embodiments, the block of metadata items MD1 is reconstructed by performing an XOR operation using P1, MD2, MD3, and MD4, as is understood by those of ordinary skill in the art.

The storage control system 210 then utilizes the reconstructed block of metadata items MD1 of the corrupted data segment S1 to determine which local data items in the corrupted data segment S1 are missing or are otherwise corrupted, and need to be recovered (block 804). Once the block of metadata items MD1 of the corrupted data segment S1 is reconstructed, the storage control system will possess the necessary information to determine exactly which data items of the data segment S1 are missing/corrupted in the data segment S1. This is in contrast to conventional methods in which the storage control system 210 would have to identify the missing/corrupted data items by scanning the entire metadata looking for pointers to data items that reside on a corrupted data segment, which is a prohibitively slow, and resource intensive process. The storage control system 210 will recover the missing/corrupted data items by accessing the replica copies of the missing data items from other storage devices of other storage node, and then rewrite the missing data items in the local storage device (block 805).

Figure 9:
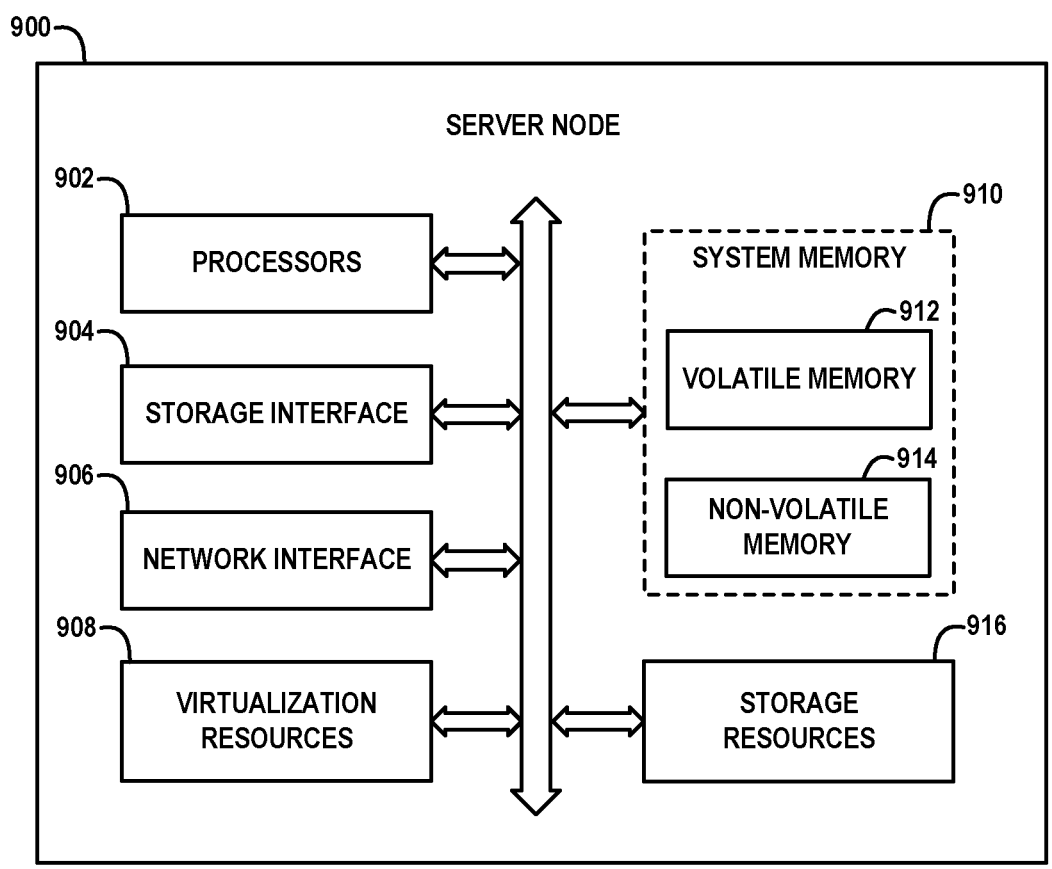
FIG. 9 schematically illustrates an architecture of a server node which can be used to implement the storage server nodes FIGS. 1 and 2, according to an exemplary embodiment of the disclosure.

FIG. 9 schematically illustrates an architecture of a server node which can be used to implement the storage nodes in FIGS. 1 and 2, according to an exemplary embodiment of the disclosure. The server node 900 comprises processors 902, storage interface circuitry 904, network interface circuitry 906, virtualization resources 908, system memory 910, and storage resources 916. The system memory 910 comprises volatile memory 912 and non-volatile memory 914. The processors 902 comprise one or more types of hardware processors that are configured to process program instructions and data to execute a native operating system (OS) and applications that run on the server node 900.

For example, the processors 902 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 904 enables the processors 902 to interface and communicate with the system memory 910, the storage resources 916, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 906 enables the server node 900 to interface and communicate with a network and other system components. The network interface circuitry 906 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 908 can be instantiated to execute one or more services or functions which are hosted by the server node 900. For example, the virtualization resources 908 can be configured to implement the various modules and functionalities of a host connectivity management system as discussed herein. In one embodiment, the virtualization resources 908 comprise virtual machines that are implemented using a hypervisor platform which executes on the server node 900, wherein one or more virtual machines can be instantiated to execute functions of the server node 900. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 900, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 908 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 900 as well execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the various systems and modules of the storage control system 210 of the storage node 200 (FIG. 2) are implemented using program code that is loaded into the system memory 910 (e.g., volatile memory 912), and executed by the processors 902 to perform respective functions as described herein. In this regard, the system memory 910, the storage resources 916, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 910 comprises various types of memory such as volatile RAM, NVRAM, or other types of memory, in any combination. The volatile memory 912 may be a dynamic random-access memory (DRAM) (e.g., DRAM DIMM (Dual In-line Memory Module), or other forms of volatile RAM. The non-volatile memory 914 may comprise one or more of NAND Flash storage devices, SSD devices, or other types of next generation non-volatile memory (NGNVM) devices. The system memory 910 can be implemented using a hierarchical memory tier structure wherein the volatile system memory 912 is configured as the highest-level memory tier, and the non-volatile system memory 914 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 902 to execute a native operating system and one or more applications or processes hosted by the server node 900, and to temporarily store data that is utilized and/or generated by the native OS and application programs and processes running on the server node 900. The storage resources 916 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
managing, by a storage control system, a storage array comprising a plurality of individual hardware storage devices, wherein each individual hardware storage device is configured to store data and comprises storage capacity, wherein at least a portion of the storage capacity of at least one individual hardware storage device of the storage array is logically partitioned into segments of equal size;
grouping, by the storage control system, at least some of the segments of the at least one individual hardware storage device of the storage array into a segment group, wherein each segment of the segment group is configured to store one or more data items and associated metadata items;
generating, by the storage control system, a parity data segment based on the segments of the segment group of the at least one individual hardware storage device;
persistently storing, by the storage control system, the parity data segment in association with the segment group; and
in response to detecting, by the storage control system, a partial storage device error resulting from a corrupted segment of the segment group of the at least one individual hardware storage device, utilizing the parity data segment and non-corrupted segments of the segment group of the at least one individual hardware storage device to recover at least one missing data item of the corrupted segment and storing at least one recovered data item on the at least one individual hardware storage device;
wherein generating the parity data segment based on the segments within the segment group comprises extracting metadata items of all segments of the segment group and computing parity over all the extracted metadata items separate from the data items.

2. The method of claim 1, wherein the segments of the at least one individual hardware storage device comprise log segments of a log-structured array which is managed by the storage control system.

3. The method of claim 1, wherein persistently storing the parity data segment in association with the segment group comprises storing the parity data segment in a persistent memory device which resides on a storage server node which hosts the storage control system.

4. The method of claim 1, wherein utilizing the parity data segment and the non-corrupted segments of the segment group to recover at least one missing data item of the corrupted segment comprises:
accessing the parity data segment associated with the segment group;

accessing the metadata items from each non-corrupted segment of the segment group;

reconstructing the metadata items of the corrupted segment using the parity data segment and the metadata items of the non-corrupted segments of the segment group;

utilizing the reconstructed metadata items to identify a missing data item in the corrupted segment;

accessing a replica of the data item, which is identified as the missing data item, from a replica storage device; and storing the replica of the data item on the at least one individual hardware storage device to thereby rebuild the corrupted segment.

5. The method of claim 4, wherein accessing the replica of the data item from the replica storage device comprises accessing the replica of the data item from a given replica storage device which is included with the at least one individual hardware storage device in a replication group of a mesh replication system.

6. The method of claim 1, wherein computing parity over all the extracted metadata items separate from the data items comprises:

grouping the extracted metadata items from each segment of the segment group into respective blocks of metadata items for the respective segments; and computing the parity data segment for the segment group by computing parity over the blocks of metadata items for the respective segments.

7. The method of claim 1, wherein metadata items of respective data items comprise information associated with the respective data items, wherein the information comprises one or more of an identity of the respective data items, sizes of the respective data items, offset locations of the respective data items within a given segment, and locations where replica copies of the respective data items reside.

8. An article of manufacture comprising a non-transitory processor-readable storage medium having stored therein program code of one or more software programs, wherein the program code is executable by one or more processors to implement a method which comprises:

managing, by a storage control system, a storage array comprising a plurality of individual hardware storage devices, wherein each individual hardware storage device is configured to store data and comprises storage capacity, wherein at least a portion of the storage capacity of at least one individual hardware storage device of the storage array is logically partitioned into segments of equal size;

grouping, by the storage control system, at least some of the segments of the at least one individual hardware storage device of the storage array into a segment group, wherein each segment of the segment group is configured to store one or more data items and associated metadata items;

generating, by the storage control system, a parity data segment based on the segments of the segment group of the at least one individual hardware storage device;

persistently storing, by the storage control system, the parity data segment in association with the segment group; and in response to detecting, by the storage control system, a partial storage device error resulting from a corrupted segment of the segment group of the at least one individual hardware storage device, utilizing the parity data segment and non-corrupted segments of the segment group of the at least one individual hardware storage device to recover at least one missing data item of the corrupted segment and storing at least one recovered data item on the at least one individual hardware storage device;

wherein generating the parity data segment based on the segments within the segment group comprises extracting metadata items of all segments of the segment group and computing parity over all the extracted metadata items separate from the data items.

9. The article of manufacture of claim 8, wherein the segments of the at least one individual hardware storage device comprise log segments of a log-structured array which is managed by the storage control system.

10. The article of manufacture of claim 8, wherein the program code for persistently storing the parity data segment in association with the segment group comprises program code for storing the parity data segment in a persistent memory device which resides on a storage server node which hosts the storage control system.

11. The article of manufacture of claim 8, wherein the program code for utilizing the parity data segment and the non-corrupted segments of the segment group to recover at least one missing data item of the corrupted segment comprises:

program code for accessing the parity data segment associated with the segment group;

program code for accessing the metadata items from each non-corrupted segment of the segment group;

program code for reconstructing the metadata items of the corrupted segment using the parity data segment and the metadata items of the non-corrupted segments of the segment group;

program code for utilizing the reconstructed metadata items to identify a missing data item in the corrupted segment;

program code for accessing a replica of the data item, which is identified as the missing data item, from a replica storage device; and program code for storing the replica of the data item on the at least one individual hardware storage device to thereby rebuild the corrupted segment.

12. The article of manufacture of claim 11, wherein the program code for accessing the replica of the data item from the replica storage device comprises program code for accessing the replica of the data item from a given replica storage device which is included with the at least one individual hardware storage device in a replication group of a mesh replication system.

13. The article of manufacture of claim 8, wherein the program code for computing parity over all the extracted metadata items separate from the data items comprises:

program code for grouping the extracted metadata items from each segment of the segment group into respective blocks of metadata items for the respective segments; and program code for computing the parity data segment for the segment group by computing parity over the blocks of metadata items for the respective segments.

14. The article of manufacture of claim 8, wherein metadata items of respective data items comprise information associated with the respective data items, wherein the information comprises one or more of an identity of the respective data items, sizes of the respective data items, offset locations of the respective data items within a given segment, and locations where replica copies of the respective data items reside.

15. A system, comprising:
a storage server node comprising at least one processor, and a system memory configured to store program code, wherein the program code is executable by the at least one processor to implement a storage control system which is hosted by the storage server node and which is configured to:
manage a storage array comprising a plurality of individual hardware storage devices, wherein each individual hardware storage device is configured to store data and comprises storage capacity, wherein at least a portion of the storage capacity of at least one individual hardware storage device of the storage array is logically partitioned into segments of equal size;
group at least some of the segments of the at least one individual hardware storage device of the storage array into a segment group, wherein each segment of the segment group is configured to store one or more data items and associated metadata items;
generate a parity data segment based on the segments of the segment group of the at least one individual hardware storage device;
persistently store the parity data segment in association with the segment group; and
in response to detecting a partial storage device error resulting from a corrupted segment of the segment group of the at least one individual hardware storage device, utilize the parity data segment and non-corrupted segments of the segment group of the at least one individual hardware storage device to recover at least one missing data item of the corrupted segment and storing at least one recovered data item on the at least one individual hardware storage device;
wherein generating the parity data segment based on the segments within the segment group comprises extracting metadata items of all segments of the segment group and computing parity over all the extracted metadata items separate from the data items.

16. The system of claim 15, wherein in persistently storing the parity data segment in association with the segment group, the storage control system is configured to store the parity data segment in a persistent memory device which resides on the storage server node.

17. The system of claim 15, wherein
in utilizing the parity data segment and the non-corrupted segments of the segment group to recover at least one missing data item of the corrupted segment, the storage control system is configured to:
access the parity data segment associated with the segment group;
access the metadata items from each non-corrupted segment of the segment group;
reconstruct the metadata items of the corrupted segment using the parity data segment and the metadata items of the non-corrupted segments of the segment group;
utilize the reconstructed metadata items to identify a corrupted data item in the corrupted segment;
access a replica of the data item, which is identified as the missing data item, from a replica storage device; and
store the replica of the data item on the at least one individual hardware storage device to thereby rebuild the corrupted segment.

18. The system of claim 17, wherein in accessing the replica of the data item from the replica storage device, the storage control system is configured to access the replica of the data item from a given replica storage device which is included with the at least one individual hardware storage device in a replication group of a mesh replication system.

19. The system of claim 15, wherein the segments of the at least one individual hardware storage device comprise log segments of a log-structured array which is managed by the storage control system.

20. The system of claim 15, wherein in computing parity over all the extracted metadata items separate from the data items, the storage control system is configured to:
group the extracted metadata items from each segment of the segment group into respective blocks of metadata items for the respective segments; and
compute the parity data segment for the segment group by computing parity over the blocks of metadata items for the respective segments.

* * * * *